(12) United States Patent
Kamon

(10) Patent No.: US 10,828,787 B2
(45) Date of Patent: Nov. 10, 2020

(54) DRIVE MECHANISM OF TWO DEGREES OF FREEDOM

(71) Applicant: KAWASAKI JUKOGYO KABUSHIKI KAISHA, Kobe-shi, Hyogo (JP)

(72) Inventor: Masayuki Kamon, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 53 days.

(21) Appl. No.: 15/781,465

(22) PCT Filed: Dec. 5, 2016

(86) PCT No.: PCT/JP2016/086123
§ 371 (c)(1),
(2) Date: Jun. 4, 2018

(87) PCT Pub. No.: WO2017/094922
PCT Pub. Date: Jun. 8, 2017

(65) Prior Publication Data
US 2019/0168400 A1    Jun. 6, 2019

(30) Foreign Application Priority Data

Dec. 3, 2015  (JP) ................................ 2015-236635

(51) Int. Cl.
*B25J 17/02* (2006.01)
*F16H 21/02* (2006.01)
(Continued)

(52) U.S. Cl.
CPC ........... *B25J 17/0275* (2013.01); *B25J 9/106* (2013.01); *B25J 9/123* (2013.01); *B25J 17/00* (2013.01);
(Continued)

(58) Field of Classification Search
CPC ........ B25J 17/0275; B25J 9/106; B25J 9/123; B25J 17/00; B25J 17/0266; F16C 11/06; F16H 21/02; F16H 21/46
See application file for complete search history.

(56) References Cited

U.S. PATENT DOCUMENTS

| 7,099,743 B2 * | 8/2006 | Lee ..................... B25J 9/1065 318/568.1 |
| 9,375,851 B2 * | 6/2016 | Nagatsuka ........... B25J 17/0266 |
| 2014/0238177 A1 | 8/2014 | Nagatsuka |

FOREIGN PATENT DOCUMENTS

| EP | 1829651 A1 | 9/2007 |
| EP | 1857230 A1 | 11/2007 |

(Continued)

OTHER PUBLICATIONS

Feb. 28, 2017 International Search Report issued in International Patent Application No. PCT/JP2016/086123.
(Continued)

*Primary Examiner* — Thomas C Diaz
(74) *Attorney, Agent, or Firm* — Oliff PLC

(57) ABSTRACT

A power transmission unit of a drive mechanism has a link mechanism on both sides of a base portion. The link mechanism has a first link member having a base end portion provided to the base portion to be rotated about a third rotational axis, a second link member having a base end portion connecting the first link member's distal end portion to be rotated about a fourth rotational axis, and a third link member which is provided to a driven body to be rotated about a fifth rotational axis and to which the second link member's distal end portion is provided to be rotated about a sixth rotational axis orthogonal to the fifth rotational axis. A desired operation angle range of two degrees of freedom (Continued)

in a driven body can be ensured with a compact configuration while suppressing deflection of a structure to which the driven body is mounted.

5 Claims, 9 Drawing Sheets

(51) Int. Cl.
    *B25J 17/00*     (2006.01)
    *F16H 21/46*     (2006.01)
    *B25J 9/12*     (2006.01)
    *B25J 9/10*     (2006.01)
    *F16C 11/06*     (2006.01)
    *B62D 57/032*     (2006.01)

(52) U.S. Cl.
    CPC ........... *B25J 17/0266* (2013.01); *F16C 11/06* (2013.01); *F16H 21/02* (2013.01); *F16H 21/46* (2013.01); *B62D 57/032* (2013.01)

(56) References Cited

FOREIGN PATENT DOCUMENTS

| | | |
|---|---|---|
| JP | 2011-224752 A | 11/2011 |
| JP | 2011-224772 A | 11/2011 |
| JP | 2013-091122 A | 5/2013 |

OTHER PUBLICATIONS

Jun. 5, 2018 International Preliminary Report on Patentability issued in International Patent Application No. PCT/JP2016/086123.
Jul. 8, 2019 Search Report issued in European Patent Application No. 16870856.8.

* cited by examiner

DRIVE MECHANISM OF TWO DEGREES OF FREEDOM

TECHNICAL FIELD

The present invention relates to a drive mechanism for transmitting power to a driven body to drive the same with operation of two degrees of freedom, and particularly to a drive mechanism applicable to a joint structure of a robot.

BACKGROUND ART

Conventionally, in a robot having a joint structure, various drive mechanisms are adopted for operating a joint portion in a desired angle range.

For example, in a humanoid robot, a drive mechanism for operating a joint portion such as an ankle joint is provided. Here, the joint portion of the humanoid robot needs to realize both a tilt operation about a rotational axis extending in the cross direction (roll operation) and a tilt operation about a rotational axis extending in the lateral direction (pitch operation).

Additionally, in order to realize bipedal walking of the robot, it is needed to move the joint portion in a relatively large angle range. To realize this, a planetary gear speed increasing mechanism and the like have been attempted to be applied thereto.

SUMMARY OF INVENTION

Objects to be Achieved by the Invention

However, when trying to ensure the large operation angle range in the joint portion at two degrees of freedom, particularly a deflection in the pitch direction increases and a large gear is needed to ensure a required joint torque.

Note that, in not only the drive mechanism of the humanoid robot but also other types of robot drive mechanisms and a drive mechanism of other than the robot, there are cases that the operation of two degrees of freedom in the driven body needs to be realized in a relatively large angular range.

The present invention is made considering the above-mentioned problems of the conventional techniques, and its object is to provide a drive mechanism capable of ensuring a desired operation angle range of two degrees of freedom in a driven body with a compact configuration while suppressing deflection of a structure to which the driven body is mounted.

Means for Achieving the Objects

In order to achieve the objects above, a first aspect of the present invention is a drive mechanism for transmitting power to a driven body to drive the driven body with an operation of two degrees of freedom, comprising: a base portion having a center axis; a universal joint for tiltably connecting the driven body to the base portion; and a power transmission unit for transmitting the power to the driven body, wherein the universal joint has a first rotational axis orthogonal to the center axis and a second rotational axis orthogonal to the first rotational axis and tiltable about the first rotational axis, wherein the driven body is provided to the universal joint so as to be rotated about the second rotational axis, wherein the power transmission unit has a pair of link mechanisms arranged on both sides with respect to a first imaginary plane including the center axis and the first rotational axis, and wherein each of the pair of link mechanisms has a first link member having a base end portion provided to the base portion so as to be rotated about a third rotational axis perpendicular to the first imaginary plane, a second link member having a base end portion connected to a distal end portion of the first link member so as to be rotated about a fourth rotational axis parallel to the third rotational axis, and a third link member which is provided to the driven body so as to be rotated about a fifth rotational axis in a second imaginary plane perpendicular to the second rotational axis and to which a distal end portion of the second link member is provided so as to be rotated about a sixth rotational axis orthogonal to the fifth rotational axis.

A second aspect of the present invention is that, in the first aspect, the distal end portion of the first link member and the base end portion of the second link member are connected by a spherical joint.

A third aspect of the present invention is that, in the first or second aspect, the distal end portion of the second link member and the third link member are connected by a spherical joint.

A forth aspect of the present invention further comprises, in any one of the first to third aspects, a power generation unit for generating the power, the power generation unit has a pair of drive sources arranged on both sides with respect to the first imaginary plane.

A fifth aspect of the present invention is that, in the fourth aspect, the pair of drive sources has a pair of cylinders, wherein a distal end of each rod of the pair of cylinders is connected to the first link member.

A sixth aspect of the present invention is that, in the fifth aspect, the pair of cylinders are provided to the base portion so as to be rotated about a seventh rotational axis perpendicular to the first imaginary plane.

A seventh aspect of the present invention is that, in the fifth or sixth aspect, the cylinder is an electric cylinder having a screw shaft and a nut screwed to the screw shaft, wherein the power generation unit is configured so that the screw shaft is rotationally driven thereby driving the nut forward and backward to generate the power.

An eighth aspect of the present invention is that, in any one of the first to seventh aspects, a distance between the third rotational axis and the fourth rotational axis is different from a distance between the second rotational axis and the sixth rotational axis when it is parallel to the second rotational axis.

Advantageous Effect of the Invention

According to the present invention, there can be provided a drive mechanism capable of ensuring a desired operation angle range of two degrees of freedom in a driven body with a compact configuration while suppressing deflection of a structure to which the driven body is mounted.

EMBODIMENT OF THE INVENTION

Figure 1:
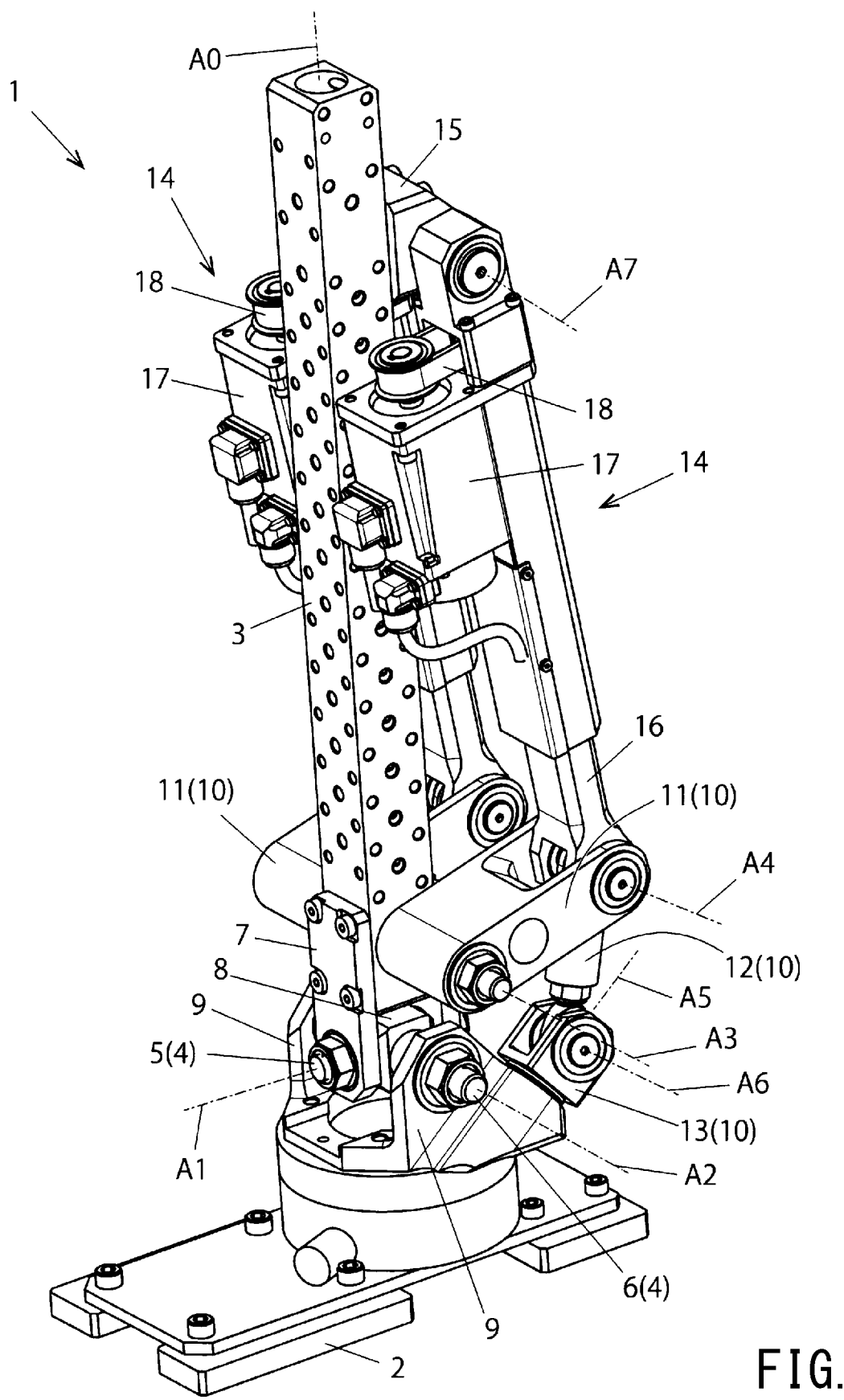
FIG. 1 is a perspective view illustrating a drive mechanism according to one embodiment of the present invention.
Figure 2:
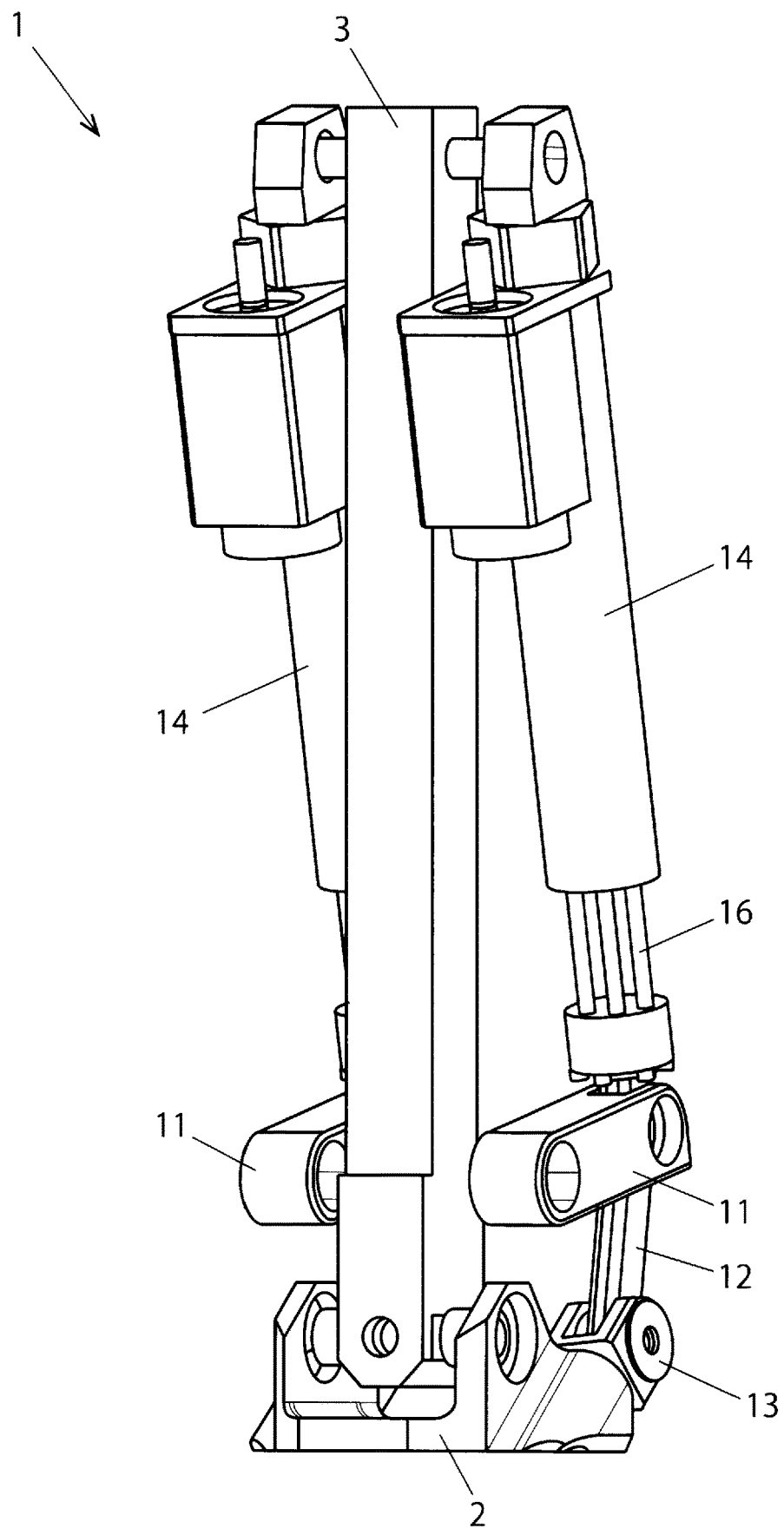
FIG. 2 is another perspective view illustrating the drive mechanism in FIG. 1.

Hereunder, a drive mechanism according to one embodiment of the present invention will be described referring to the drawings. Note that the drive mechanism according to this embodiment is particularly suitable for a drive mechanism in a joint portion (for example, ankle joint) of a humanoid robot.

Note that the drive mechanism according to the present invention is not limited to application to the joint portion of the humanoid robot and can be broadly applied to a drive mechanism in a driven body requiring operation of at least two degrees of freedom.

The drive mechanism 1 according to this embodiment illustrated in FIG. 1 is for realizing the operation of two degrees of freedom in a driven body 2. The driven body 2 is for example a component of an ankle joint of the humanoid robot, and performs operation of at least two degrees of freedom upon walking.

The drive mechanism 1 comprises an elongated frame member (base portion) 3 having a center axis A0 in the longitudinal direction. A universal joint 4 is provided at a lower end portion of the frame member 3, and a driven body 2 is tiltably connected to the frame member 3 by the universal joint 4.

The universal joint 4 has a first rotational axis A1 orthogonal to the center axis A0 and a second rotational axis A2 orthogonal to the first rotational axis A1 and tiltable about the first rotational axis A1.

The universal joint 4 comprises a first axis member 5 extending along the first rotational axis A1 and a second axis member 6 extending along the second rotational axis A2. The first axis member 5 is supported by a mounting member 7 provided in front of and behind the lower end portion of the frame member 3. The second axis member 6 is supported by a block piece 8 provided at the center of the first axis member 5.

The driven body 2 has a pair of left and right flange portions 9, and the flange portions 9 are supported by the second axis member 6 of the universal joint 4 such that the driven body 2 can be rotated about the second rotational axis A2.

As mentioned above, by providing the driven body 2 at the lower end of the frame member 3 via the universal joint 4, the driven body 2 can perform a tilt operation about the first rotational axis A1 (roll operation) and the tilt operation about the second rotational axis A2 (pitch operation).

The drive mechanism 1 according to this embodiment further comprises a pair of link mechanisms 10 as a power transmission unit for transmitting power to the driven body 2. The pair of link mechanisms 10 are arranged on both sides with respect to a first imaginary plane including the center axis A0 and the first rotational axis A1. Each of the pair of link mechanisms 10 has a first link member 11, a second link member 12, and a third link member 13.

The first link member 11 has a base end portion provided to the left and right side surfaces of the frame member 3 so as to rotate about a third rotational axis A3 perpendicular to the first imaginary plane.

A second link member 12 has a base end portion connected to a distal end portion of the first link member 11 so as to rotate about the fourth rotational axis A4 parallel to the third rotational axis A3.

A third link member 13 is provided to the flange portion 9 of the driven body 2 so as to rotate about a fifth rotational axis A5 in a second imaginary plane perpendicular to the second rotational axis A2. A distal end portion of the second link member 12 is connected to the third link member 13 so as to rotate about a sixth rotational axis A6 orthogonal to the fifth rotational axis A5.

The distal end portion of the first link member 11 and the base end portion of the second link member 12 are connected by a spherical joint. Further, the distal end portion of the second link member 12 and the third link member 13 are connected by a spherical joint.

A pair of electric cylinders (drive sources) 14 as a power generation unit are provided to the both left and right sides of the frame member 3 of the drive mechanism 1 symmetrically with respect to the first imaginary plane. The base end portion of the electric cylinder 14 is connected to a block member 15 provided to the frame member 13 so as to rotate about a seventh rotational axis A7 parallel to the second rotational axis A2.

A distal end of each rod 16 of the pair of electric cylinders 14 is connected to the distal end portion of the first link member 11 so as to rotate about the fourth rotational axis A4.

Each of the pair of electric cylinders 14 is provided with a servo motor 17 which can be driven independently from each other. The electric cylinder 14 has a ball screw mechanism therein, and power of the servo motor 17 is transmitted to the ball screw mechanism via a belt 18.

In the drive mechanism 1 illustrated in FIG. 2 to FIG. 7, the rod of the electric cylinder 14 is configured by a plurality of elongated members, while the other structure is the same as the drive mechanism 1 illustrated in FIG. 1. Note that, in FIG. 3, FIG. 5, and FIG. 6, part of the cylinder body is cut out so that the internal structure of the electric cylinder 14 can be seen.

Figure 3:
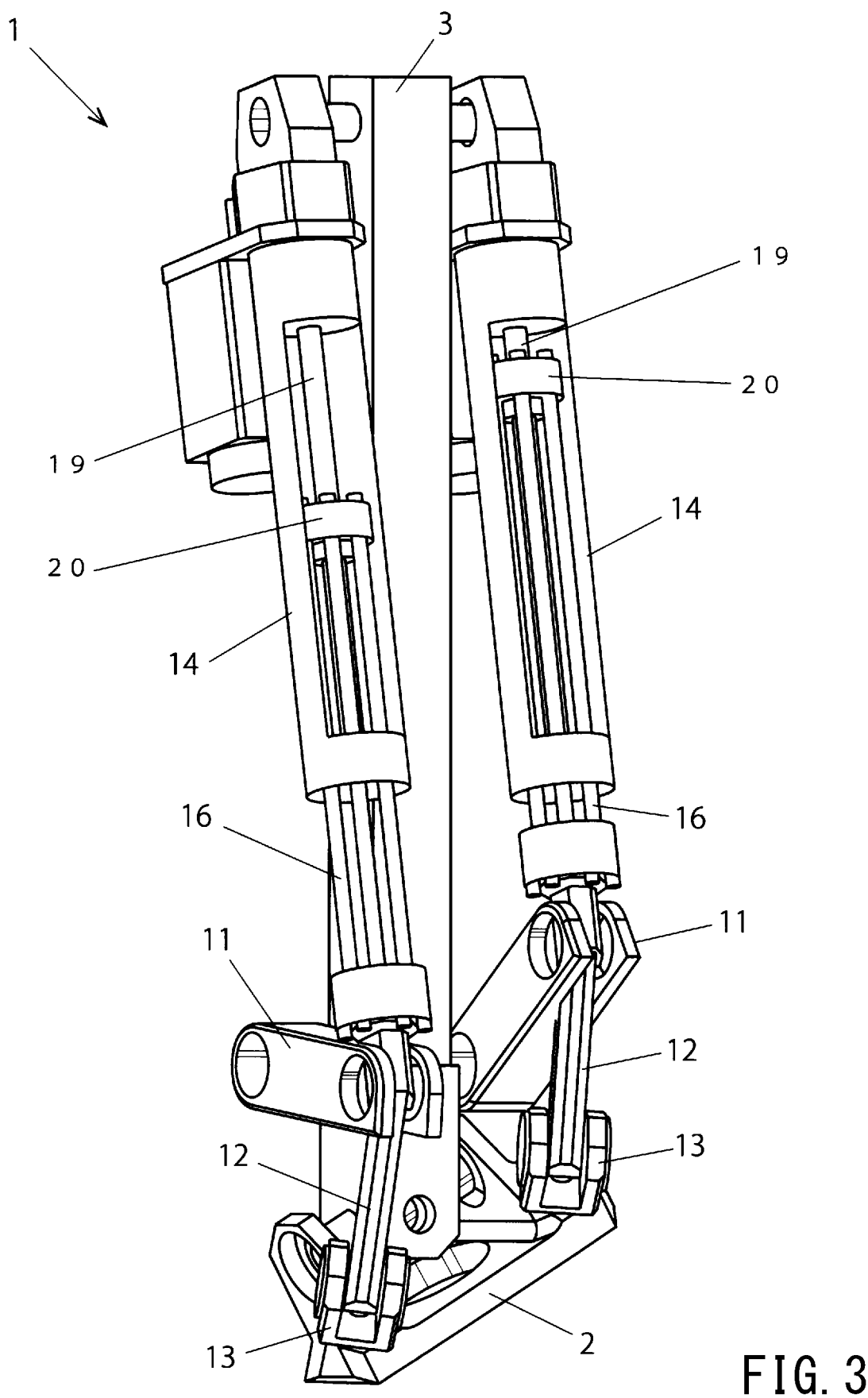
FIG. 3 is another perspective view illustrating the drive mechanism in FIG. 1.
Figure 4:
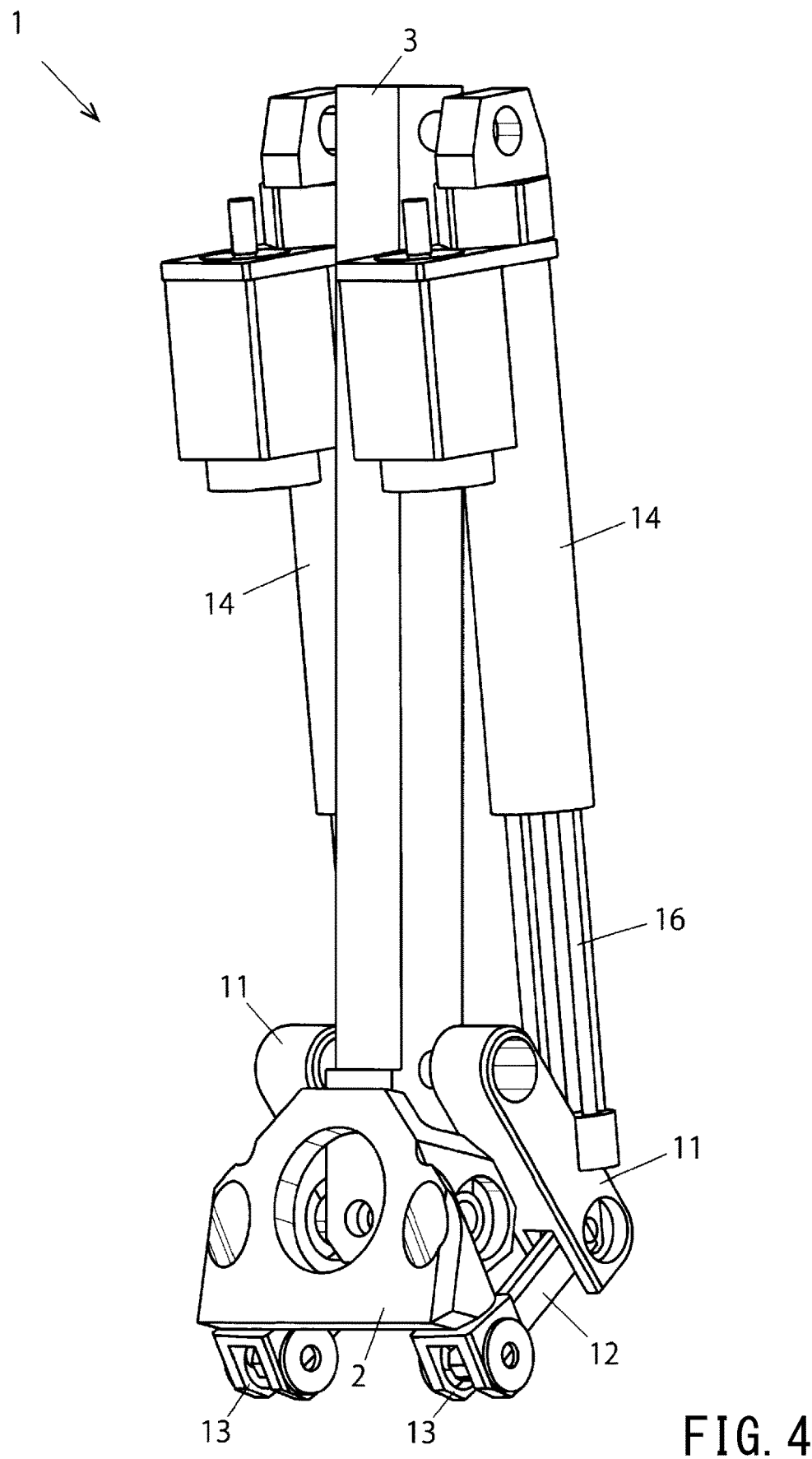
FIG. 4 is another perspective view illustrating the drive mechanism in FIG. 1.
Figure 5:
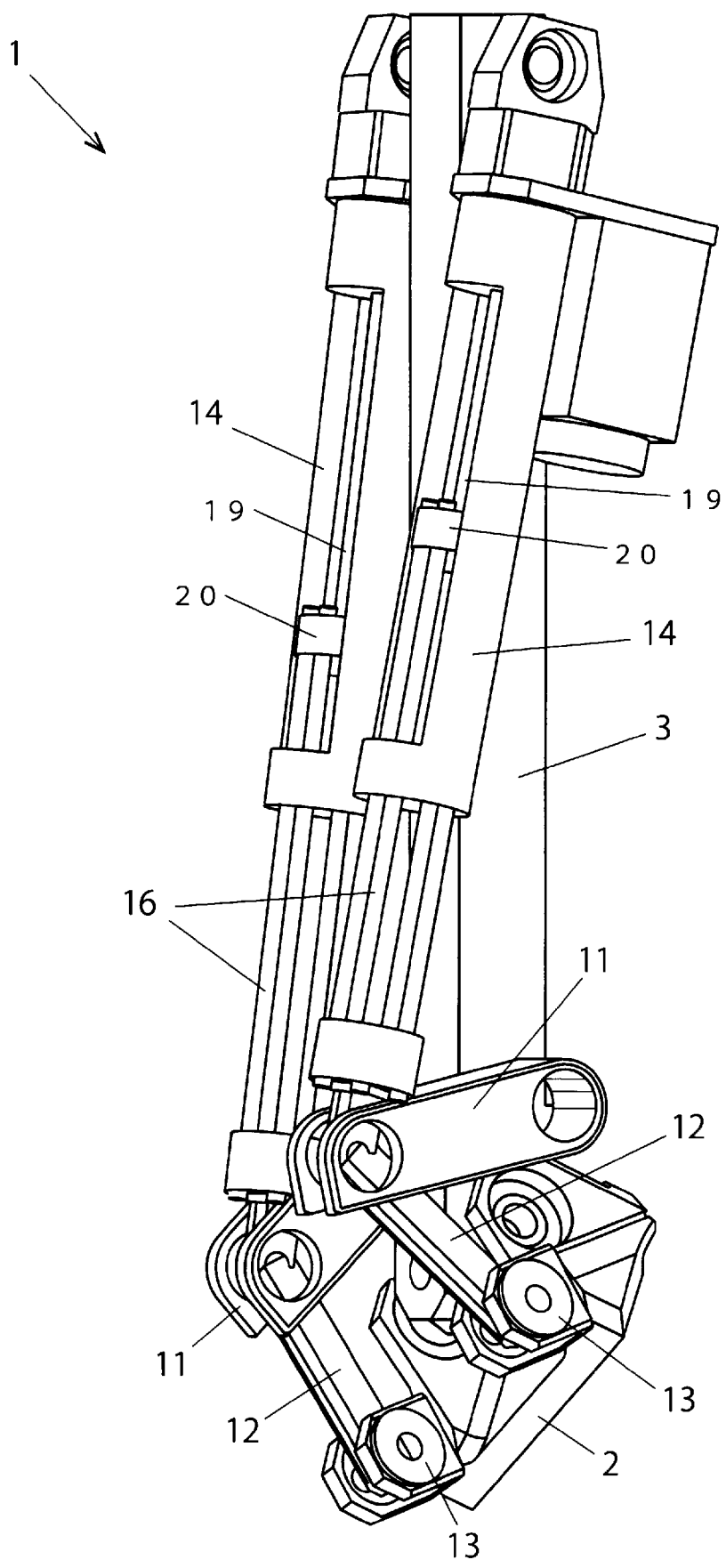
FIG. 5 is another perspective view illustrating the drive mechanism in FIG. 1.
Figure 6:
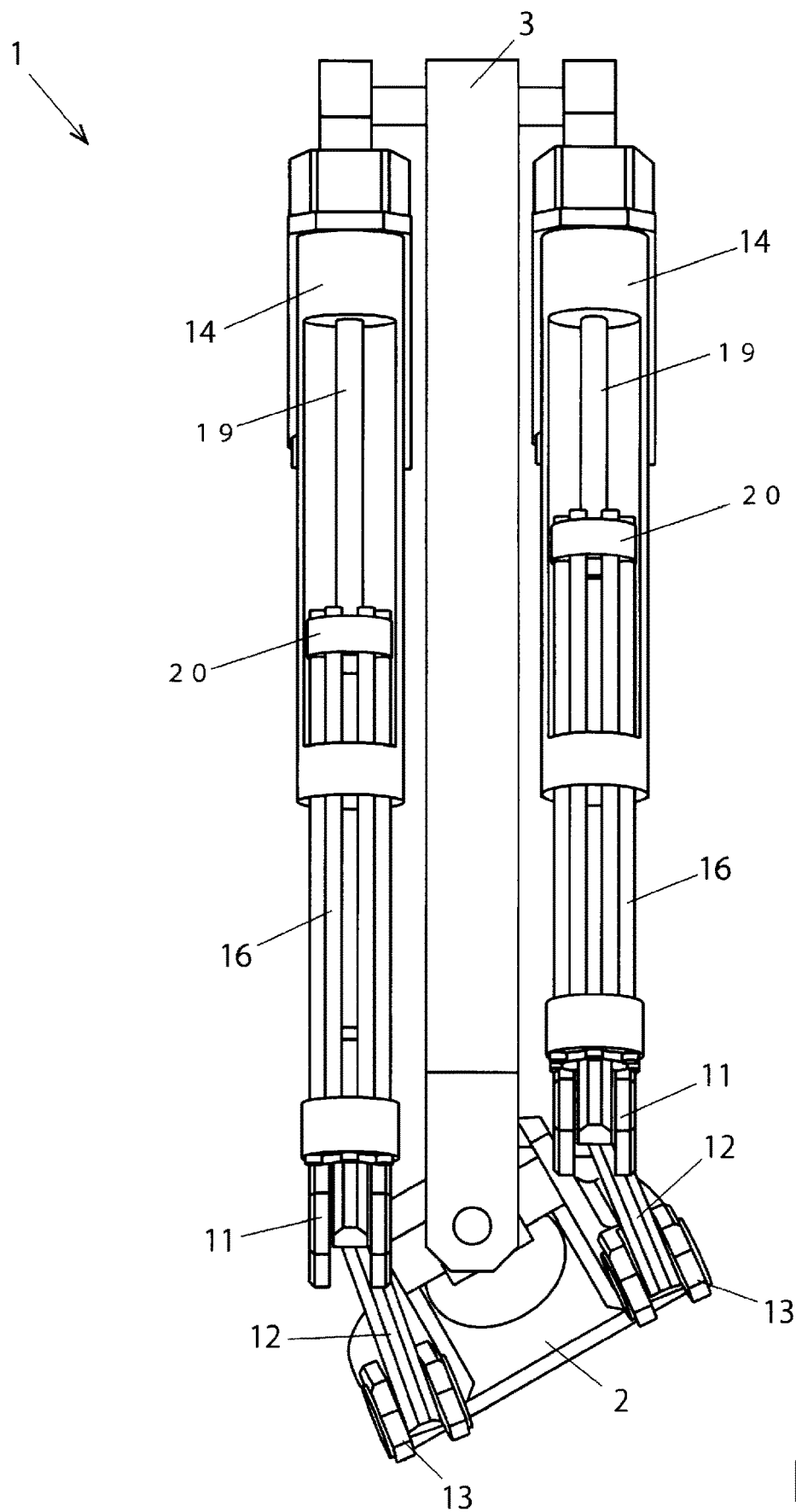
FIG. 6 is another perspective view illustrating the drive mechanism in FIG. 1.
Figure 7:
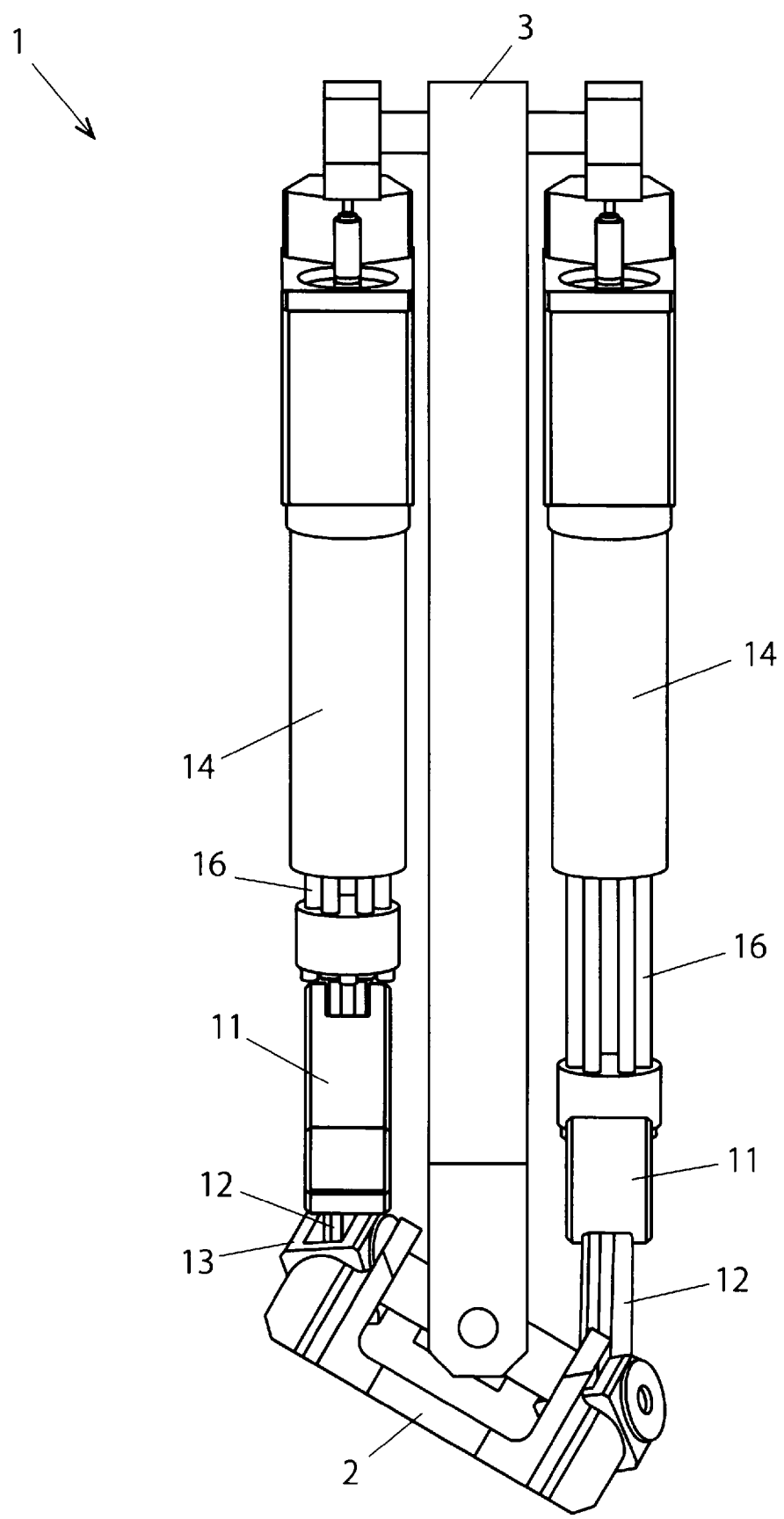
FIG. 7 is another perspective view illustrating the drive mechanism in FIG. 1.

As illustrated in FIG. 3, FIG. 5, and FIG. 6, in the drive mechanism 1 according to this embodiment, a screw shaft 19 of the electric cylinder 14 is rotationally driven so that a nut 20 screwed to the screw shaft 19 is driven forward and backward along the screw shaft 19. Note that a base end portion of the rod 16 is connected to the nut 20, and the rod 16 is driven forward and backward integrally with the nut 20.

Thus, by the configuration that the screw shaft 19 is rotationally driven to drive the nut 20 forward and backward, various merits as described below will be obtained, comparing to the configuration that the nut is rotationally driven to drive the screw shaft forward and backward.

First, the mechanical efficiency is increased, compared to the case that the nut is rotationally driven to drive the screw shaft forward and backward. Secondly, a structure to be driven can be formed more easily compared to the case when the nut is rotationally driven to drive the screw shaft forward and backward. Thirdly, when the nut is rotationally driven, the screw shaft goes in and out via the nut forward and backward, thus a dead space is formed and the space factor is deteriorated.

As illustrated in FIG. 1 and FIG. 2 to FIG. 7, by changing the extension/contraction amount of the rods 16 of the left and right electric cylinders 14 independently from each other, the roll operation and pitch operation can be performed in the driven body 2.

As described above, in the drive mechanism 1 according to this embodiment, power of the pair of electric cylinders 14 mounted to the frame member 3 is transmitted to the driven body 2 via the pair of link mechanisms 10 without using a planetary gear speed increasing mechanism. Therefore, it is possible to secure a desired operation angle range in the driven body 2 without causing a large deflection as in the case of using the planetary gear speed increasing mechanism.

Additionally, in the drive mechanism 1, the distance between the third rotational axis A3 and the fourth rotational axis A4 is set to be longer than the distance between the second rotational axis A2 and the sixth rotational axis A6 when it is parallel to the second rotational axis A2. Thereby, it is possible to secure a speed increasing ratio when driving the rod 16 of the electric cylinder 14 so as to be extended/contracted to cause the driven body 2 to perform the tilt operation. As a result, the stroke required in the electric cylinder 14 becomes shorter and the electric cylinder 14 can be shortened.

Figure 8:
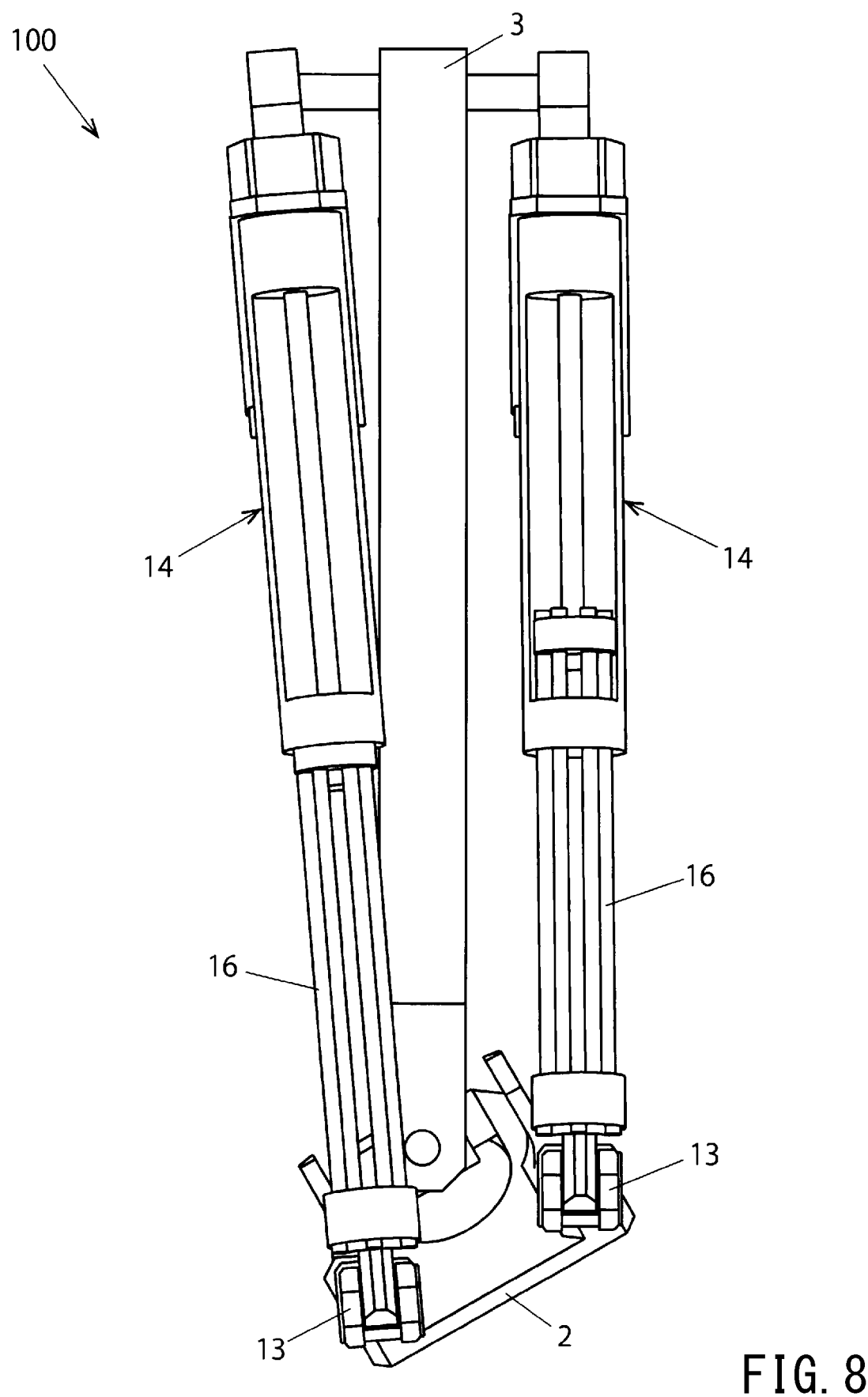
FIG. 8 is a perspective view illustrating a comparative example of the drive mechanism.
Figure 9:
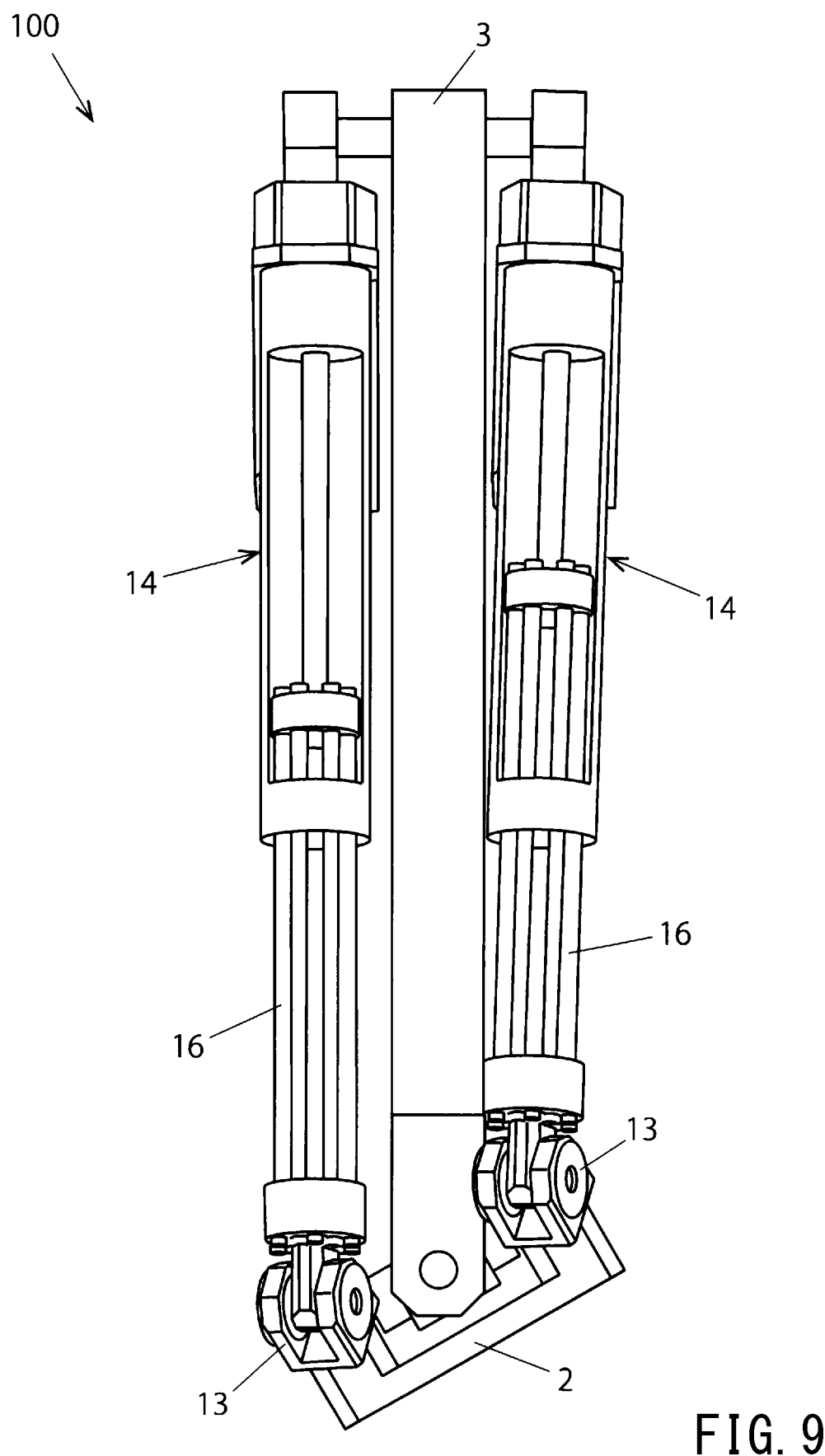
FIG. 9 is another perspective view illustrating the drive mechanism in FIG. 8.

FIG. 8 and FIG. 9 illustrate a drive mechanism 100 as a comparative example. In this example, the first link member 11 and the second link member 12 are omitted and the rod 16 of the electric cylinder 14 is directly connected to the third link member 13. Note that, in FIG. 8 and FIG. 9, part of the cylinder body is cut out so that the internal structure of the electric cylinder 14 can be seen.

As seen from the FIG. 8 and FIG. 9, in this drive mechanism 100 as a comparative example, when the rod 16 of the electric cylinder 14 is extended/contracted for performing the tilt operation (roll operation and pitch operation) in the driven body 2, the entire electric cylinder 14 swings in the lateral direction accordingly.

Therefore, components of the robot cannot be arranged in the range of the swing operation in the lateral direction of the electric cylinder 14, and it is difficult to arrange members for increasing strength of the robot and cover members for covering the internal structure, for example.

In contrast, in the drive mechanism 1 according to this embodiment, even when the rod 16 of the electric cylinder 14 is extended/contracted for performing the tilt operation (roll operation and pitch operation) in the driven body 2, the electric cylinder 14 does not swing in the lateral direction and swings only in a direction parallel to the first imaginary plane including the center axis A0 of the frame member 3 and the first rotational axis A1, as illustrated in FIG. 1 to FIG. 7.

Accordingly, the degree of freedom of arrangement of members for increasing the strength of the robot and cover members for covering the internal structure is significantly improved. Additionally, the electric cylinder 14 can be shortened as described above, thereby enhancing the degree of freedom of arrangement of the robot's components.

Note that, ball bearings are provided at the both ends of second link member 12 for expanding the tiltable range of the driven body 2 in the above-described embodiment, while the ball bearing may be provided at only one end of the second link member 12.

Additionally, although the electric cylinder 14 driven by the servo motor 17 is used as a drive source in the above-described embodiment, the drive source (power generating unit) in the drive mechanism according to the present invention is not limited to this and any drive source may be employed as long as it can control the rotation angle of the first link member 11 about the third rotational axis A3.

DESCRIPTION OF REFERENCE NUMERALS

1 . . . drive mechanism
2 . . . driven body
3 . . . frame member (base portion)
4 . . . universal joint
5 . . . first axis member
6 . . . second axis member
7 . . . mounting member
8 . . . block piece
9 . . . flange portion
10 . . . link mechanism (power transmission unit)
11 . . . first link member
12 . . . second link member
13 . . . third link member
14 . . . electric cylinder
15 . . . block member
16 . . . rod of electric cylinder
17 . . . servo motor
18 . . . belt
19 . . . screw shaft of electric cylinder
20 . . . nut of electric cylinder
A0 . . . center axis of base portion
A1 . . . first rotational axis
A2 . . . second rotational axis
A3 . . . third rotational axis
A4 . . . forth rotational axis
A5 . . . fifth rotational axis
A6 . . . sixth rotational axis
A7 . . . seventh rotational axis

The invention claimed is:

1. A drive mechanism for transmitting power to a driven body so as to drive the driven body at an operation of two degrees of freedom, comprising:
a base portion having a center axis;
a universal joint for tiltably connecting the driven body to the base portion;
a power transmission unit for transmitting the power to the driven body,
wherein the universal joint has a first rotational axis orthogonal to the center axis and a second rotational axis orthogonal to the first rotational axis and tiltable about the first rotational axis,
wherein the driven body is provided to the universal joint so as to be rotated about the second rotational axis,
wherein the power transmission unit has a pair of link mechanisms which are arranged on both sides with respect to a first imaginary plane including the center axis and the first rotational axis, and
wherein each of the pair of link mechanisms has a first link member having a base end portion provided to the base portion so as to be rotated about a third rotational axis perpendicular to the first imaginary plane, a second link member having a base end portion connected to a distal end portion of the first link member so as to be rotated about a fourth rotational axis parallel to the third rotational axis, and a third link member which is provided to the driven body so as to be rotated about a fifth rotational axis in a second imaginary plane perpendicular to the second rotational axis and to which a distal end portion of the second link member is provided so as to be rotated about a sixth rotational axis orthogonal to the fifth rotational axis; and a power generation unit for generating the power,
wherein the power generation unit has a pair of drive sources which are arranged on both sides with respect to the first imaginary plane,
wherein the pair of drive sources has a pair of cylinders,
wherein a distal end of each rod of the pair of cylinders is connected to the first link member,
wherein the cylinder is an electric cylinder having a screw shaft and a nut screwed to the screw shaft, and
wherein the power generation unit is configured such that the screw shaft is rotationally driven thereby driving the nut forward and backward to generate the power.

2. The drive mechanism according to claim 1,
wherein the distal end portion of the first link member and the base end portion of the second link member are connected by a spherical joint.

3. The drive mechanism according to claim 1,
wherein the distal end portion of the second link member and the third link member are connected by a spherical joint.

4. The drive mechanism according to claim 1,
wherein the pair of cylinders are provided to the base portion so as to be rotated about a seventh rotational axis perpendicular to the first imaginary plane.

5. The drive mechanism according to claim 1,
wherein a distance between the third rotational axis and the fourth rotational axis is different from a distance between the second rotational axis and the sixth rotational axis when the sixth rotational axis is parallel to the second rotational axis.

\* \* \* \* \*